United States Patent [19]
Tiger

[11] 3,898,004
[45] Aug. 5, 1975

[54] MICROFICHE READER-PRINTER

[75] Inventor: Emil Tiger, Highland Park, Ill.

[73] Assignee: Bell & Howell Company, Chicago, Ill.

[22] Filed: Nov. 8, 1973

[21] Appl. No.: 414,608

[52] U.S. Cl. .................................. 355/45; 355/53
[51] Int. Cl. ......................................... G03b 13/28
[58] Field of Search ........................... 355/5, 45, 53

[56] References Cited
UNITED STATES PATENTS

| | | | |
|---|---|---|---|
| 3,220,302 | 11/1965 | Cuthbert, Jr. et al. | 355/45 X |
| 3,765,759 | 10/1973 | Yamada | 355/45 |

Primary Examiner—Richard A. Wintercorn
Attorney, Agent, or Firm—Robert A. Walsh

[57] ABSTRACT

The reader-printer includes an electro-mechanical control mechanism, roll paper storage and feed mechanism, paper cutter, and a corona paper charger in the upper portion of the machine. A light source, optical lens and microfiche carrier are disposed in the lower portion of the machine together with a paper developer, dryer and discharge chute. The optical system includes two movably disposed mirrors operative to project one selected fiche image either on a viewing screen on the front of the machine, or rearwardly to an exposure station whereat a selected size paper is momentarily retained to permit exposure. The electro-mechanical control mechanism functions to effect sequential operation of each of the machine elements whereby a selected fiche image is read and printed.

4 Claims, 8 Drawing Figures

MICROFICHE READER-PRINTER

BACKGROUND OF THE INVENTION

1. Field of the Invention

The subject invention relates to an apparatus for projecting a positive or negative microfiche image on a screen for viewing purposes and thereafter projecting a selected image on a charged sensitive paper to obtain a printed image on a pre-selected size of paper.

2. Background of the Prior Art

The introduction of the modern copier has revolutionized the procedures relating to record reproductions and the storage thereof. The early machines were costly and messy to use. Gradually the cost and the use problems relating to such office equipment were overcome whereby full reliance is now placed on the use of a master microfiche as a source for obtaining any desired number of enlarged electrostatically printed copies. A single machine to permit both the reading and printing of a microfiche enabled further cost and time savings.

SUMMARY OF THE INVENTION

An object of the invention is to provide an improved microfiche reader-printer.

Another object of the invention is to provide a reader-printer having an improved and simplified electro-mechanical control system.

Another object of the invention is to provide a reader-printer having an improved electro-mechanical control system selectively operable to provide a variation in projection light intensity, instant convertibility for use as a reader or printer, or to project a selected image from a positive or negative microfiche to provide varied size prints.

A further object of the invention relating to a microfiche reader-printer apparatus is an improved electro-mechanical control including a motor driven cam mechanism to provide an operating cycle to control the optical system, the paper feed and cut-off, the electrostatic charging of the paper, the retention and exposure of the paper, and the development, drying and discharge of a printed copy from the apparatus.

A still further object of the invention is an improved reader-printer apparatus adapted to utilize rolls of paper of selected widths and having a paper carrier spool adjustable to retain paper rolls of each width in a fixed position to insure continuously aligned feeding of the paper through the apparatus during a printing cycle.

Other objects and advantages of the invention will become apparent from the following description of the preferred embodiment together with the accompanying drawings.

DETAILED DESCRIPTION OF THE INVENTION

Figure 1:
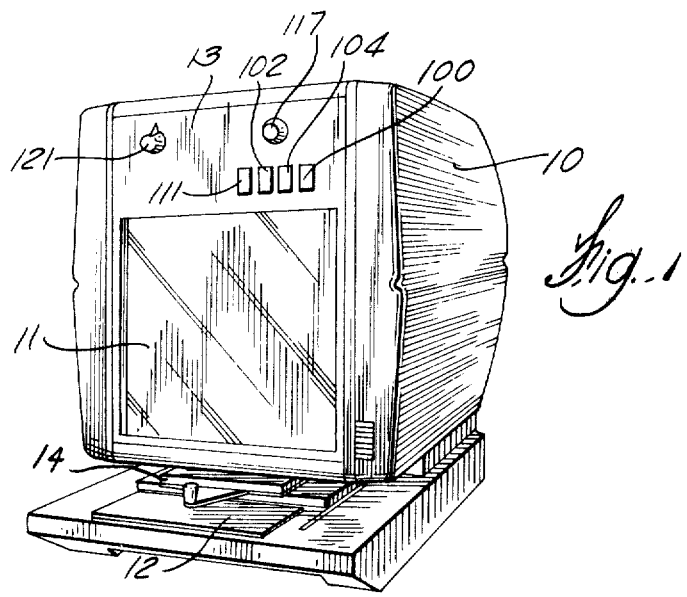
FIG. 1 is a perspective view of a microfiche reader-printer.
Figure 2:
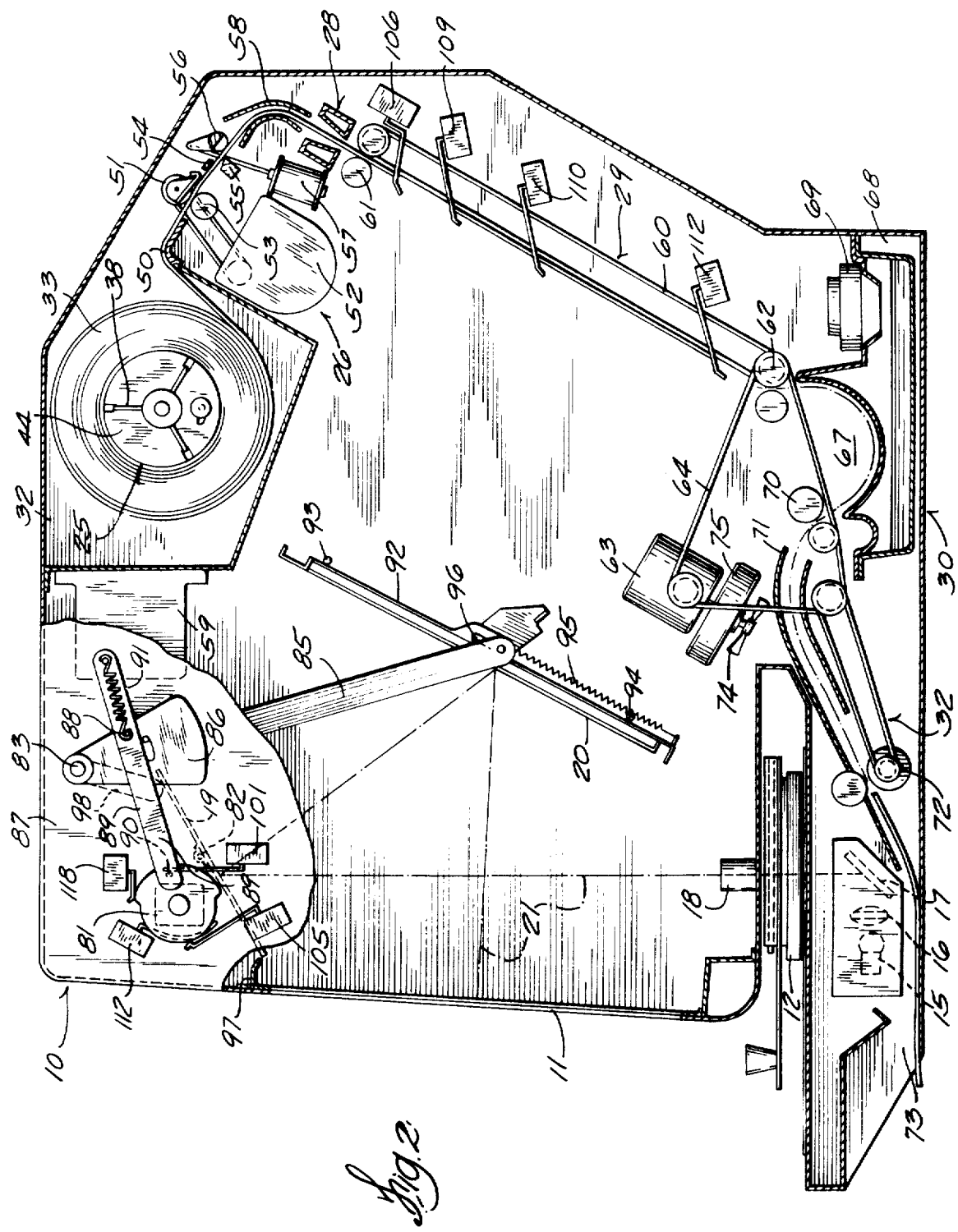
FIG. 2 is a simplified vertical section of the apparatus showing the location of the principle components as well as the positioning of the mirrors to enable viewing of a microfiche image on the screen.

As shown in FIGS. 1 and 2, the microfiche reader-printer is contained in a housing 10 having a glass screen 11, microfiche carrier 12 and a control panel 13 exteriorly disposed on the front thereof for ready accessiblity. A microfiche 14 is placed on the carrier 12, which, in turn, is manipulated to position any selected image on the microfiche for viewing on the screen 11.

A source of light is derived from a dual intensity halogen lamp 15 mounted in the base of the housing 10 beneath the carrier 12, as shown in FIG. 2. The light beam is directed horizontally through a lens 16 to a mirror 17 whereat it is directed upwardly through the fiche 14 to project a selected image thereon to a floating magnification lens assembly 18 which is adjustable via a knob mounted on the front of the housing. The projecting light beam is directed vertically to a mirror 19, angularly to a mirror 20, and thereafter to the backside of the opaque screen 11 whereupon the image can be viewed to permit the operator to determine whether the desired image has been properly selected. The path of image projection for reading purposes is shown by the dash lines 21 in FIG. 2.

Figure 3:
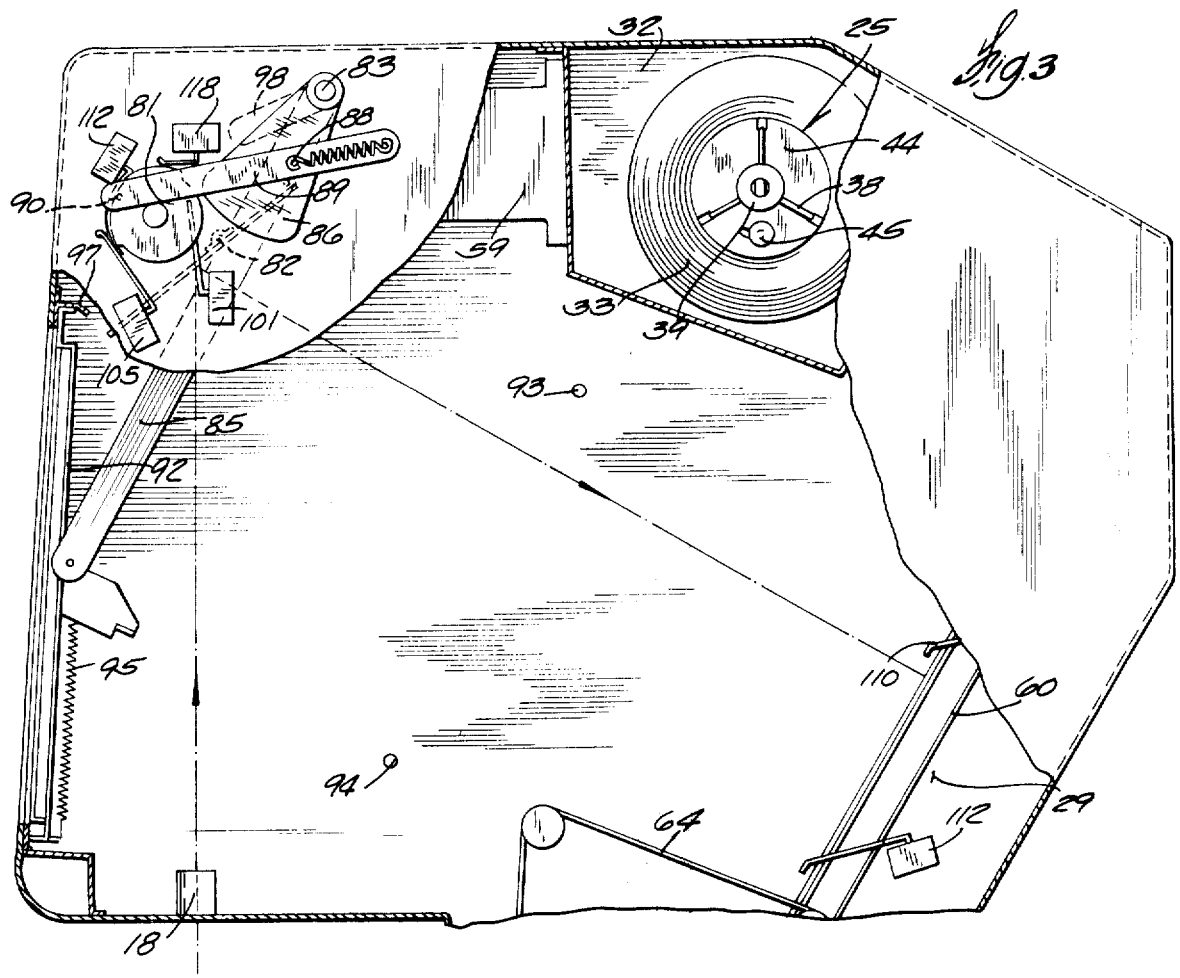
FIG. 3 is an enlarged vertical section similar to FIG. 2 with the mirrors positioned to enable a microfiche image to be projected and printed on sensitized paper.

In order to effect exposure for printing purposes, the path of image projection is redirected to that shown by the dash lines 22 in FIG. 3. This is accomplished by the repositioning of the mirrors 19 and 20. The angular position of mirror 19 is changed by means of a cam control mechanism, to be hereinafter described in detail, to direct the image projection rearwardly within the housing. Simultaneously, the mirror 20 is repositioned to shift forwardly into full abutting engagement with the backside of the screen 11 whereby exterior light into the housing is completely blocked to permit exposure of sensitized paper during the image printing sequence of the operation.

The other components within the housing 10 serve to provide means for providing enlarged prints from the projected microfiche image. These components included a paper roll retainer 25, a paper feed drive 26, a paper severing device 27, a paper sensitizer 28, a conveyor 29, a sensitized paper toner and dryer 30 and a paper discharge conveyor and chute 31. The general assemblage of these components is best shown in FIG. 2.

The paper roll retainer or spool 25 is rotatably mounted within a compartment 32 in the upper portion of the housing 10. The top panel of the housing is readily movable to permit immediate access to the spool 25 within the compartment. Thus, a roll of paper 33 can be easily installed on the retainer or spool after the latter has been removed from the compartment. The spool is readily removable or insertable into a pair of shaft hangers 34 and 35 secured to the inner sidewalls of the housing 10, as shown in FIG. 6.

The structure of the spool 25 serves to carry paper rolls 33 containing paper of different widths. Thus, if the magnification of the fiche image will permit printing on a smaller size sheet, or if it is desirable for the sake of uniformity to make prints on paper of a particular width, the operator need only make a simple adjustment on the spool.

The spool 25 is rotatably mounted on a fixed shaft 36. Each end of the shaft is provided with a pair of flats 37 which engage the side of the hangers 34 and 35 and thereby prevent the rotation of the shaft. Spaced pressure bars 38 are mounted in a pair of hubs 39 rotatably disposed adjacent to the ends of the shaft 36. The pressure bars 38 are formed with a slight outward bow in a manner such that the bars present a slightly greater central diameter than that at the left and at the right ends as viewed in FIG. 6. Thus, when the pressure bars 38 engage the inner core of a paper roll 33, the resulting pressure on the bars will retain the roll on the spool regardless of the position thereon or of the width of the roll.

Figure 6:
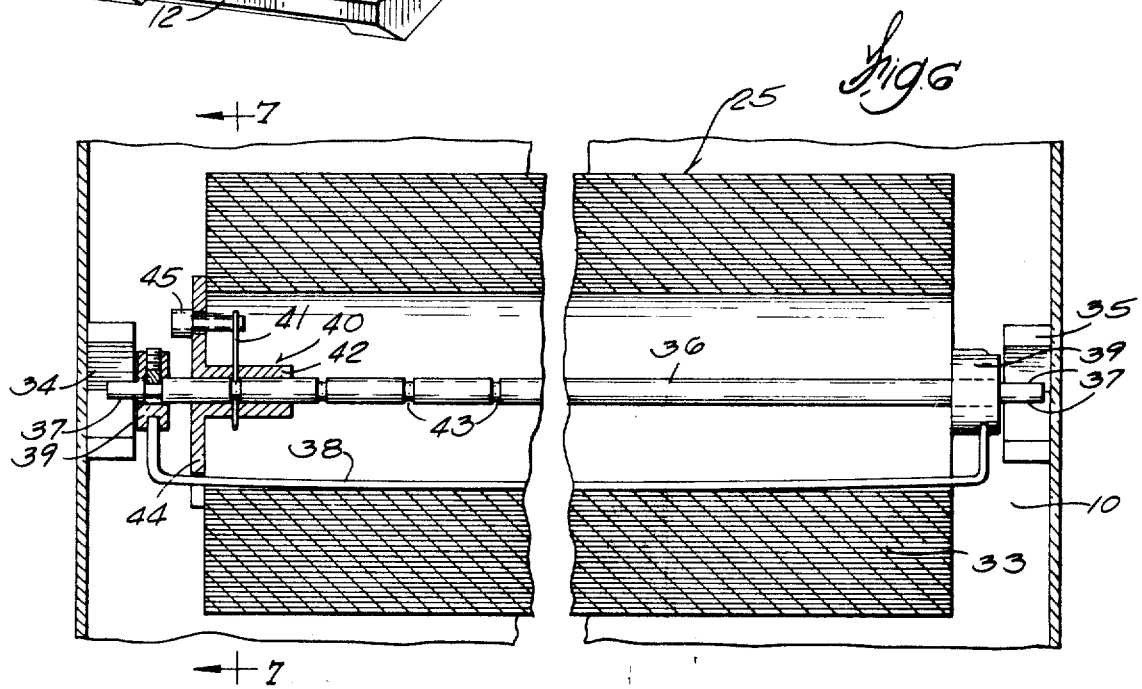
FIG. 6 is a plan view partially in section of the paper carrier spool adaptable to receive rolls of paper of different widths.
Figure 7:
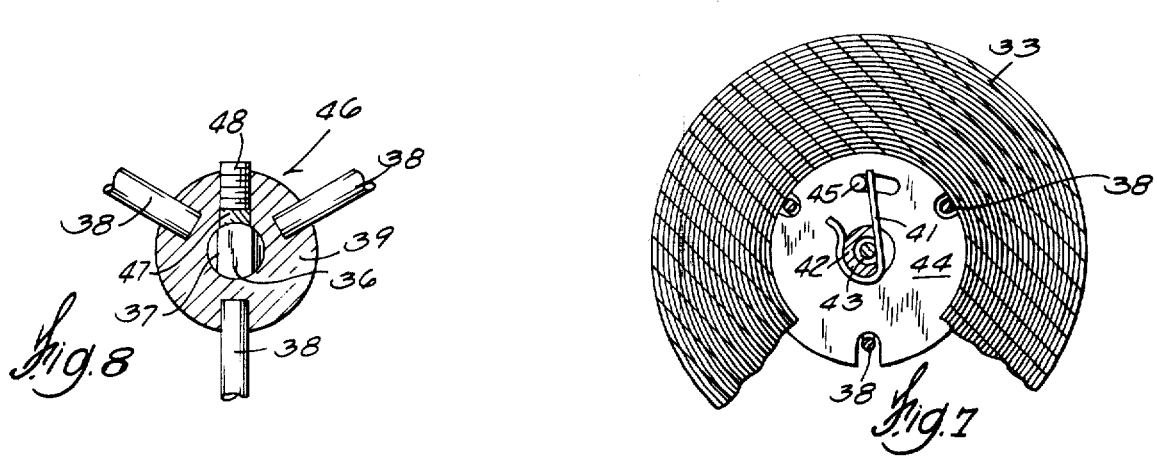
FIG. 7 is a sectional view taken on the line 7—7 in FIG. 6 showing the adjustable side plate of the spool.

To preadjust the spool to properly receive and retain a roll of paper of a selected width, a slide hub and disc assembly 40 mounted on the shaft is provided for ready manual setting while the spool 25 is removed from the apparatus (See FIGS. 6 and 7). A latch spring 41 in the hub 42 normally engages one of the grooves 43 in the shaft in a manner to prevent the axial displacement of the assembly and thus the face of a disc 44 serves as an abutting wall against which a roll of paper is retained. The manipulation of a release knob 45 enables the operator to release the spring 42 in a manner whereby the assembly 40 can be axially moved along the shaft 36 and provide a selected setting as required for a particular width of paper. With the simplified setting provided, it is possible to readily change from one paper width to another without any time lapse and with the knowledge that the paper is properly positioned on the spool 25 for aligned feeding into the machine.

Figure 8:
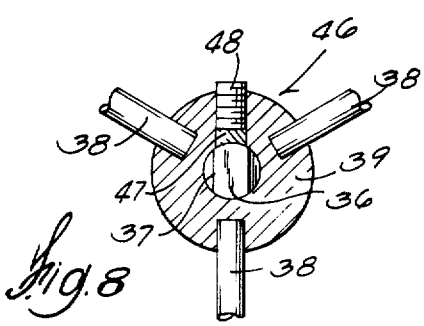
FIG. 8 is an enlarged view of one hub of the spool showing the drag clutch therein.

As viewed in FIG. 8 a drag clutch 46 is provided to insure that the paper will be continuously withdrawn from the roll under a uniform tension. The clutch consists of a tension plug 47 which is disposed in a hole and retained by means of a setting screw 48. The end of the tension plug engages the face of a groove in the shaft 36. A desired degree of tension may be placed on the spool by adjusting the screw 48.

Paper is withdrawn from the roll 33 over a lead guide bar 50 through engagement with a feed roll 51 which is belt driven by means of a feed motor 52. An idler 53 engages the feed roll 51 and the paper passes therebetween and into engagement with a guide bar 54 which, in turn, directs the paper into a severing device 27. As viewed in FIG. 2, a fixed cutter blade 55 is disposed beneath the paper while a movable cutter blade 56 is disposed above the paper. The latter is actuated by means of a solenoid 57. Paper of a selected length is directed into a guide chute 58 and through a corona or sensitizer device 28 whereat the paper is electrostatically sensitized. The corona 28 is electrically operated through a power pack 59 mounted in the housing 10. Thereafter, the paper is directed to the conveyer 29 which is comprised of a series of adjacently disposed belts 60 angularly positioned in the rear portion of the housing to receive the sheet of paper and carry it downwardly to a position whereat it can be exposed. Engagement of the paper with the belts in a perfectly flat position is insured through the operation of an idler roller 61 which engages the paper at the same instant that the paper engages the belts. The belts 60 are mounted on a common drive shaft 62. The latter, in turn, is power driven by a drive motor 63 which is connected thereto by means of a chain and sprocket mechanism 64.

After the exposure cycle has been completed, the exposed sheet of paper is fed downwardly by the power driven belts 60 into a well 67 integrally formed in a removable toner tray 68. Prior to the entry of the paper into the well 67, a pump 69 operates to pump the toner fluid from the lower part of the tray 68 into the well whereby the paper will be fully immersed in the fluid during the period in which it passes through the well. Immediately upon leaving the well, the paper is engaged by a pair of power-driven squeegee rollers 70 which force all of the excess fluid from the paper and return it into the well.

Thereafter the paper is fed into a curved guide 71 which feeds the paper forwardly and downwardly into engagement with power driven rollers 72 operative until the paper is delivered into a discharge chute 73 at the front end of the housing 10. While the paper is travelling forwardly to the discharge chute, it is subjected to a stream of air which is created by means of a fan 74 which is power driven by a motor 75. The fan 74 serves a dual purpose insofar as it provides a stream of air to rapidly dry the print and to provide a stream of air which will cool the lamp 15 mounted beneath the microfiche carrier 12. Thus, the extreme heat which is created by the high intensity lamp 15 will be rapidly dissipated, and the life of the lamp will be prolonged considerably.

The toner tray or drawer 68 is a completely self contained unit for developing sensitized sheets of paper passing therethrough. Liquid is normally contained in the bottom of the tray and is pumped into the well 67 by means of a pump 69 only during the period in which sheets of paper are passing therethrough. Thereafter any liquid remaining in the well automatically drains back into the bottom part of the tray. The entire tray may be readily removed through an opening in the rear portion of the housing 10.

Figure 4:
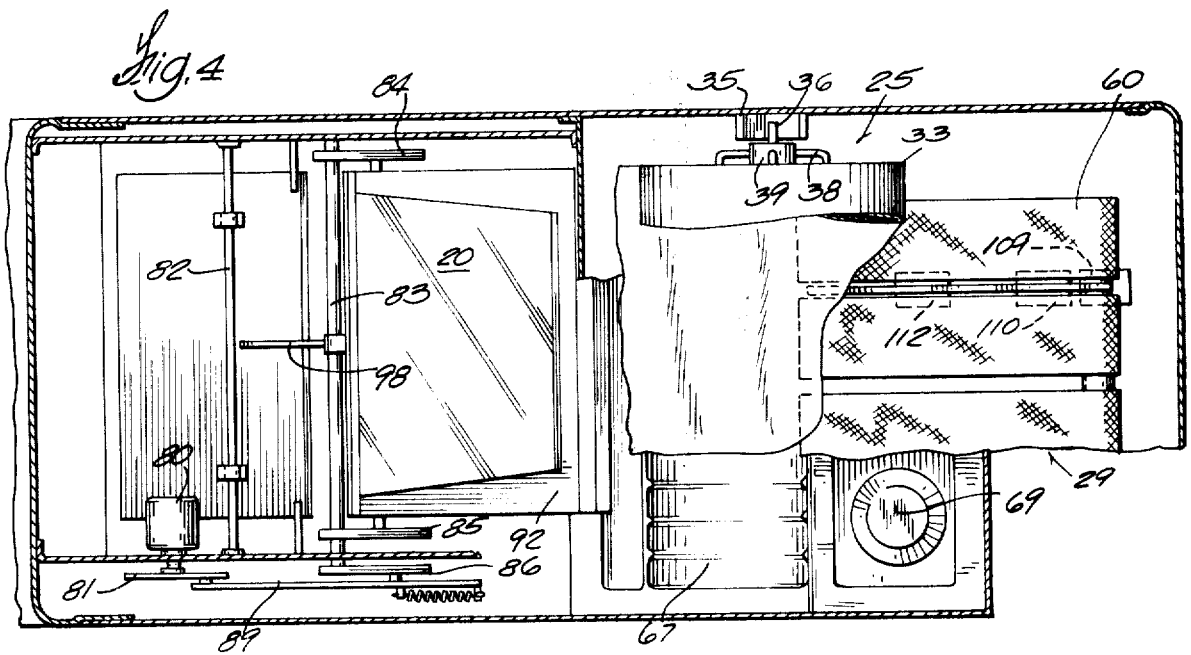
FIG. 4 is a top section through the apparatus showing portions of the internal mechanism.

The use of the microfiche reader-printer apparatus, either in the reading capacity or in the printing capacity is dependent upon the proper positioning of the mirrors 19 and 20 as previously identified. Such movement is effected by means of a power drive, including a timer motor 80 serving to effect rotation of a cam disc 81. For a mode of operation requiring the reading of a microfiche, the mirrors are in the position indicated in FIGS. 2 and 4. The mirror 19 is supported for pivotal movement on a shaft 82 while the mirror 20 is operably supported on a shaft 83 with both of the shafts parallelly mounted in the housing 10. The mirror 20 is carried on a pair of support arms 84 and 85 which are adjustably secured to the shaft 83. A linkage arm 86 is mounted on the end of the shaft exteriorly of a housing wall 87. A pin 88 is fixedly secured in the arm 86. Since the cam disc 81 is likewise mounted exteriorly of the housing wall 87, a connecting arm 89 is disposed to operatively connect the disc 81 and the arm 86. A pin 90 fixedly mounted transversely in the disc provides the linkage with the arm 89 while a slot therein is disposed to fit over the pin 88 in the arm 86. A spring 91 secured to the end of the connecting arm 89 and to the extending end of the pin 88 on the arm 86 serves to provide a cushioning effect at the movement when the mirror 20 is moved rearwardly to the extreme position shown in FIG. 2.

When so positioned, a plate 92 supporting the mirror 20 is in abutment with interiorly extending pins 93 and 94 secured to the side walls of the housing 10. A spring 95 secured to the bottom of the plate 92 extends upwardly and is attached to the pin fixedly mounted in the lower ends of each of the support arms 84 and 85. Such pins extend through slot 96 in rearwardly extending ears from the plate 92. The springs serve to retain the mirror in its uppermost position whenever it is conditioned for a reading mode. At the same time an arm 98 secured to the shaft 83 will have rotated counterclockwise so that the arm will engage the backside of the mirror 19 and cause it to tilt downwardly to the position shown in FIG. 2. At this time the microfiche image projected from the magnifying lens 18 will strike the mirror 19 and be deflected to the mirror 20 and to the backside of the screen 11. An operator can then readily determine whether the image is one which should be printed.

If so, the initiation of a printing cycle will cause the cam disc 81 to rotate counterclockwise in a manner whereby the arm 89 will move forwardly from the position shown in FIG. 2 to the position shown in FIG. 3. This will cause the shaft 83 to rotate in a manner that the arm 98 will be disengaged from the backside of the mirror 19 and thus permit the mirror to tilt upwardly to the position shown in FIG. 3. Rotation of the shaft 83 will likewise cause the arms 84 and 85 to move forwardly and enable the mirror and the backing plate to initially pivot about the fixed pins 94. Thus, the mirror will tilt from the reading mode position forwardly so that it's upper edge will lead the lower edge as the arms continue to move until the upper edge of the mirror plate 92 engages the rear side of the screen 11. The upper edge of the plate will strike the screen frames in the vicinity of the top edge and permit the plate to slide upwardly until it reaches a stop 97. Continued movement of the arms 84 and 85 will cause the lower portion of the mirror plate 92 to move forwardly until the entire face of the mirror engages the rear face of the screen 11. Thus, light originating exteriorly of the housing can no longer enter through the screen. At this time a microfiche image projected through the magnifying lens 18 will strike the mirror 19 along the paths indicated by the dash lines 22 whereby such image is projected onto the sensitized paper positioned for exposure to the rearwardly portion of the apparatus.

When the apparatus is recycled for a succeeding reading mode, the support arms 84 and 85 will again move rearwardly from the position shown in FIG. 3. At that time the springs 95 connected to the plate 92 will pull the plate upwardly on the pin in the slot 96 and cause the mirror to return to the same tilted position, so that the top edge thereof will become disengaged from the stop 97 and permit the mirror 20 to be moved rearwardly to the reading position.

Figure 5:
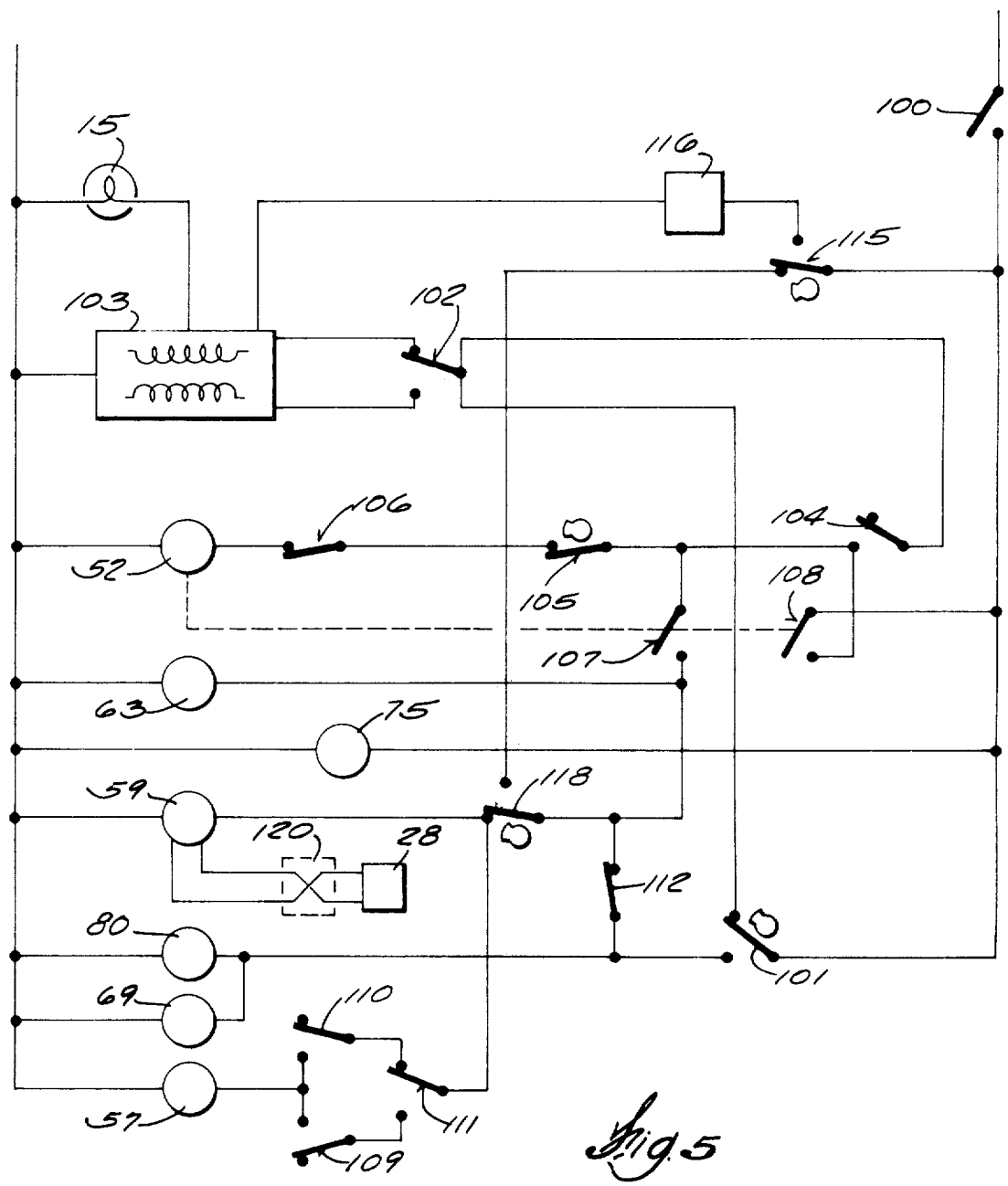
FIG. 5 is a schematic diagram of the control system for rendering the printer-reader operative.

The operating cycle of the apparatus is effected by means of the electrical circuitry depicted by the schematic diagram shown in FIG. 5. The circuit is energized initially through the manipulation of a switch 100. This will cause the fan motor 75 to be energized continuously and provide an air stream over the lamp 15 and insure the dissipation of excess heat which originates therefrom as well as any heat buildup which may occur within the housing 10. Simultaneously a circuit will be completed through a pair of normally closed contacts in a cam actuated micro switch 101 to a light selector switch 102. Dependent upon the lighting condition exteriorly of the apparatus, the operator will have previously set the switch 102 to provide either a low intensity light projection onto the screen 11 or a high intensity light projection onto the screen. Thus, a circuit will be completed through an appropriate winding within the transformer 103 to the projection lamp 15. Since the mirrors 19 and 20 have previously been returned to a reading mode, it is now possible to view the image on the screen 11. If in viewing an image, the operator discovers that the microfiche 14 in the carrier 12 is not the correct one, he can readily insert another therein at this point. Or, if he finds that the image on the screen is not proper, he can then adjust the carrier to a different position whereat another microfiche image will be presented for viewing on the screen 11.

If a print cycle is to be initated, it is then necessary to manually manipulate a "print" switch 104. This will serve to complete a circuit from the line serving switch 102 to the paper feed motor 52 whereby the feed motor is energized to feed paper from the roll 33 into the apparatus. Two normally closed microswitches are included in the feed motor circuitry. Feed motor switch 105 is cam controlled in order to permit the circuit to be interrupted when there is no paper in the machine. Thus, the circuit to the feed motor is interrupted. The other normally closed microswitch 106 is mounted on the framework immediately adjacent to the conveyor belts 60 in a manner to be actuated by the passage of paper at that point. When the actuating arm thereof engages paper, the switch 106 will open to interrupt the circuit to the paper feed motor 52.

Whenever power is supplied to the feed motor 52, a pair of switches 107 and 108 are actuated as the result of solenoidal operation responsive to energization of the feed motor. The closure of the normally open switch 108 will serve to continue the power supply to the feed motor. The closure of the normally open switch 107 will serve to complete the circuit to the conveyor drive motor 63, the power pack 59, the pump 69, the timer motor 80 and the cutter solenoid 57. As the leading edge of the paper advances, it will be fed to the moving belts 60 and idler pulley 61 and advance therebetween until the leading edge actuates the extending arm of the normally closed microswitch 106 whereby the circuit to the feed motor 52 is interrupted. However, the paper will then continue to advance downwardly since the belts 60 are then power driven.

When the timer motor 80 is energized, the cam disc 81 will rotate to actuate the switch 101 to complete a circuit through a normally closed microswitch 112 to the drive motor 63, the power pack 59, the pump 69, and the timer motor 80, and the cutter solenoid 57. When power to the feed motor is discontinued, the switches 107 and 108 immediately open. However, since the timer motor 80 is still energized, the cam 81 will continue to rotate. Both normally open switches 109 and 110 are mounted on the frame so that the actuating arms thereof are positioned to be engaged by the leading edge of the paper as it advances on the conveyor belts 60. Since the operator will have manipulated a copy length selector switch 111 before the printing cycle was initiated, only one of these two switches will be in the circuit. The switch 109 serves to measure the short length of paper while the switch 110 serves to measure the long length of paper. Thus, if the selector switch 111 is positioned to indicate that a long length of paper is desired, the switch will have been positioned as indicated in FIG. 5 whereby a circuit will be completed therethrough from the switch 111 to the severing solenoid 57. Immediately upon the energization of the solenoid, the cutter 27 will operate to sever the paper at that indicated length whereby the sheet of paper can then advance until the edge thereof will engage the actuating arm of the microswitch 112. When this occurs, the circuit to the drive motor 63, the power pack 59, and the solenoid 57 is interrupted. However, since the switch 101 is still positioned as previously described, the pump motor 69 and the timer motor 80 will remain energized.

Exposure of the sensitized paper will be effected in the following manner. The rotation of cam disc 81 will cause the mirrors 19 and 20 to be moved in the manner previously described whereat the microfiche image can be projected onto the mirror 19 and rearwardly onto the paper. At the same time, the pin 90 extending through the face of the cam disc will engage the actuating arm of a two-position microswitch 115. This will complete a circuit from the main line through the switch 115 to a dimmer relay 116 and to the transformer 103 and the halogen lamp 15. The dimmer relay is adjustable by manipulating the control knob 117 on the front of the housing 10. Such adjustment is necessary so that the operator is able to effectively obtain a print which has the necessary detailed clarity and also to enable him to compensate for line voltage variations which, in turn could otherwise result in prints of varying clarity.

The light source for projecting the microfiche image to the sensitized paper will only remain energized for a sufficient period of time to insure the obtainment of a good print of the image. The exposure period is determined by the time that the contacts within the switch 115 remain engaged because of the actuation effected through the rotating cam disc 81. As the actuating arm of the switch 115 becomes disengaged from the pin 90, the circuit will be interrupted, and the light will be extinguished.

However, the actuation of the switch 115 in this manner will then re-establish a circuit through a cam controlled microswitch 118 whereby the drive motor 63 is again energized. Thus, the exposed paper will move downwardly from the belts 60 into the toner and dryer 30. Since the toner pump motor 69 was previously energized, the developer fluid in the tray 68 will have already been pumped into the well 67 so that the paper passing therethrough is fully immersed. The paper thereafter is fed through the squeegee rollers 70 and past the fan 74 so that it can be dried before it is fed into the chute 73 and discharged exteriorly of the apparatus.

The timer motor 80 will continue to drive the cam disc and effectively operate the switch 118 whereby the circuit to the drive motor 63 is interrupted. This is necessary because there is no longer a sheet of paper within the apparatus. The cam disc 81 will also operate at this time to effectively actuate the switch 101 to interrupt the circuit to the timer motor 80 and to re-establish the circuit to the switch 102 whereupon the viewing lamp 15 will be turned on so as to permit a subsequent microfiche viewing. It should be noted that the operation of the cam disc has likewise effected the movement of the mirrors 19 and 20 so that they are again in the reading or viewing position.

The above described control circuit for a microfiche reader-printer serves to combine the many features desired in a unitary apparatus and to provide a cycle of operation which is complete and which is effected in a minimum time period. Thus, it is possible for an operator to selectively choose microfiche images from a plurality of images on a film and thereafter reproduce one or more prints as may be desired.

A further feature of the circuit relates to the ability of the apparatus to use either a positive or negative microfiche and to produce positive prints from either. This feature is rendered possible by the introduction of a switch 120 in the circuit between the power pack 59 and the corona 28. The two-position switch is disposed for ready setting of a knob 121 on the front face of the housing as shown in FIG. 1. The switch effects a reversal in the charge on the paper passing through the corona 28, so that the resulting prints produced by the apparatus will still be of a positive type. Of course, it must be born in mind that a different type of paper must be used in this event unless the operator has been utilizing paper having bi-chargeable characteristics. This feature is particularly desirable when it is necessary to work with both positive and negative microfiche films.

The microfiche reader-printer apparatus herein shown and described is intended to be representative only since certain changes may be made therein without departing from the spirit and scope of invention.

What is claimed is:

1. A viewer-printer comprising
   a. A housing to enclose the apparatus
   b. A control panel on the front of said housing
   c. A microfiche carrier operably disposed on the front of said housing to receive a microfiche therein
   d. A viewing screen disposed across the front of said housing
   e. An image projector disposed to project a light beam through said fiche and magnify said light beam, including a fiche image
   f. A pair of reflecting mirrors movable to one position whereat the projected image beam is reflected to the backside of said screen to permit viewing thereof
   g. A positioning mechanism mechanically operative to shift the positions of said mirrors to a second reading position
   h. A motorized timing cam mechanically linked to effect the selective operation of the mirror positioning mechanism wherein the mirror positioning mechanism operative by said timing cam functions to move one of said mirrors rearwardly to a stationary position for a reading cycle
   i. Pins protruding inwardly from the sidewalls of said housing to provide stops for said mirror
   j. A tension relief means to ease the movement of said mirror against said stops
   k. A linking adjustment means to permit the mirror to be pre-adjusted whereby full engagement with said stops is insured during the reading cycle
   l. A continuous paper supply source within the housing
   m. A drive mechanism to feed said paper from said source
   n. A paper measuring means o. A paper severing means operative to sever a piece of paper from the paper source
p. A paper sensitizer to place an electrostatic charge on the surface of said paper
q. A conveyor to receive and move said severed piece of paper to an exposure position whereat the paper is exposed to the light beam from one of said mirrors.
r. A toner-developing means disposed to receive said paper after exposure
s. A squeegee and dryer operative to dry the paper
t. A discharge chute to convey the sheet of paper to an outlet on the front of said housing, and
u. A control circuitry selectively operative to initiate a reading cycle and a succeeding printing cycle whereby any selected microfiche image may be readily read and a printed copy thereof obtained.

2. A viewer-printer comprising
a. A housing to enclose the apparatus
b. A control panel on the front of said housing
c. A microfiche carrier operably disposed on the front of said housing to receive a microfiche therein
d. A viewing screen disposed across the front of said housing
e. An image projector disposed to project a light beam through said fiche and magnify said light beam, including a fiche image
f. A pair of reflecting mirrors movable to one position whereat the projected image beam is reflected to the backside of said screen to permit viewing thereof
g. A positioning mechanism mechanically operative to shift the positions of said mirrors to a second reading position
h. A motorized timing cam mechanically linked to effect the selective operation of the mirror positioning mechanism
i. A continous paper supply source within the housing
j. A drive mechanism to feed said paper from said source
k. A paper measuring means
l. A paper severing means operative to sever a piece of paper from the paper source
m. A paper sensitizer to place an electrostatic charge on the surface of said paper
n. A conveyor to receive and move said severed piece of paper to an exposure position whereat the paper is exposed to the light beam from one of said mirrors
o. A toner-developing means disposed to receive said paper after exposure
p. A squeegee and dryer operative to dry the paper
q. A discharge chute to convey said sheet of paper to an outlet on the front of said housing
r. A control circuitry selectively operative to initiate a reading cycle and a succeeding printing cycle wherein
s. The mirror positioning mechanism for effecting the simultaneous movement of said mirrors to the second position required during the printing cycle includes
t. A linkage mechanism to permit the tilting of the first of said mirrors to the required position
u. A tilt initiating means associated with said second mirror to insure that the same will tilt forwardly as the positioning mechanism operates to move said mirror away from said fixed stops in said housing
v. An edge stop fixedly mounted above said screen to the interior of said housing to engage the top edge of said mirror during the forward movement thereof
w. Whereupon continued forward movement of said mirror will cause the face thereof to engage the rearside of said screen and thereby block the passage of light of exterior origin therethrough and enable the image bearing projection to be directed to the sensitized paper retained in the rearwardly portion of said housing.

3. A viewer-printer comprising
a. A housing to enclose the apparatus
b. A control panel on the front of said housing
c. A microfiche carrier operably disposed on the front of said housing to receive a microfiche therein
d. A viewing screen disposed across the front of said housing
e. An image projector disposed to project a light beam through said fiche and magnify said light beam, including a fiche image
f. A pair of reflecting mirrors movable to one position whereat the projected image beam is reflected to the backside of said screen to permit viewing thereof
g. A positioning mechanism mechanically operative to shift the positions of said mirrors to a second position
h. A motorized timing cam mechanically linked to effect the selective operation of the mirror positioning mechanism
i. A continuous paper supply source within the housing
j. A drive mechanism to feed said paper from said source
k. A paper measuring means
l. A paper severing means operative to sever a piece of paper from the paper source
m. A paper sensitizer to place an electrostatic charge on the surface of said paper
n. A conveyor to receive and move said severed piece of paper to an exposure position whereat the paper is exposed to the light beam from one of said mirrors
o. A toner-developing means disposed to receive said paper after exposure
p. A squeegee and dryer operative to dry the paper
q. A discharge chute to convey said sheet of paper to an outlet on the front of said housing
r. A control circuitry selectively operative to initiate a reading cycle and a succeeding printing cycle wherein the control circuitry includes a selector switch which may be preset to determine the size of paper which is to be used for a printing cycle
s. A switch to indicate the presence of paper from said paper supply at a predetermined point of travel onto said paper conveyor
t. A second switch operable upon contact with the leading edge of said paper upon said conveyor to indicate the length of said paper required for a short piece of printing purposes
u. A third switch operable upon engagement with the leading edge of said paper to indicate the length thereof required for a larger sheet for printing purposes v. Said second and third switches being serially connected with respective corresponding terminals to said selector switch whereby the completion of a circuit through both of said switches will serve to energize a solenoid in a manner to operate the severing device and cause the desired length of paper to be cut from the paper supply.

4. A viewer-printer comprising
a. A housing to enclose the apparatus
b. A control panel on the front of said housing
c. A microfiche carrier operably disposed on the front of said housing to receive a microfiche therein
d. A viewing screen disposed across the front of said housing
e. An image projector disposed to project a light beam through said fiche and magnify said light beam, including a fiche image
f. A pair of reflecting mirrors movable to one position whereat the projected image beam is reflected to the backside of said screen to permit viewing thereof
g. A positioning mechanism mechanically operative to shift the positions of said mirrors to a second position
h. A motorized timing cam mechanically linked to effect the selective operation of the mirror positioning mechanism
i. A continuous paper supply source within the housing wherein the paper supply source includes a spool capable of retaining a roll of paper of a desired width thereon
j. A plurality of pressure bars disposed in spaced relationship to engage the internal diameter of the roll of paper, said bars being rotatably mounted on a supporting non-rotatable shaft
k. A slide hub and disc assembly operatively mounted on said shaft so the disc face engages the side of the roll of paper whereby the roll of paper is centered on said spool bars irrespective of the width thereof in a manner to insure that the paper will be fed through the apparatus and remain properly positioned during its path of travel
l. A drive mechanism to feed said paper from said source
m. A paper measuring means
n. A paper severing means operative to sever a piece of paper from the paper source
o. A paper sensitizer to place an electrostatic charge on the surface of said paper
p. A conveyor to receive and move said severed piece of paper to an exposure position whereat the paper is exposed to the light beam from one of said mirrors
q. A toner-developing means disposed to receive said paper after exposure
r. A squeegee and dryer operative to dry the paper
s. A discharge chute to convey said sheet of paper to an outlet on the front of said housing, and
t. A control circuitry selectively operative to initiate a reading cycle and a succeeding printing cycle whereby any selected microfiche image may be readily read and a printed copy thereof obtained.

* * * * *